(12) United States Patent
Dahan et al.

(10) Patent No.: US 12,273,614 B1
(45) Date of Patent: Apr. 8, 2025

(54) CAMERA SYSTEM FOR CONDITIONAL RECORDING

(71) Applicants: Meir Dahan, Tiberias (IL); Eliahu Antopolsky, Zichron Yaakov (IL)

(72) Inventors: Meir Dahan, Tiberias (IL); Eliahu Antopolsky, Zichron Yaakov (IL)

( * ) Notice: Subject to any disclaimer, the term of this patent is extended or adjusted under 35 U.S.C. 154(b) by 0 days.

(21) Appl. No.: 19/014,542

(22) Filed: Jan. 9, 2025

(51) Int. Cl.
*H04N 23/611* (2023.01)
*G06V 20/52* (2022.01)

(52) U.S. Cl.
CPC ........... *H04N 23/611* (2023.01); *G06V 20/52* (2022.01); *G06V 2201/07* (2022.01)

(58) Field of Classification Search
CPC ... H04N 23/611; G06V 20/52; G06V 2201/07
USPC ....................................................... 382/103
See application file for complete search history.

(56) References Cited

U.S. PATENT DOCUMENTS

2009/0009598 A1* 1/2009 Sotodate ................ H04N 7/183
386/E5.005

* cited by examiner

*Primary Examiner* — Stephen P Coleman

(57) ABSTRACT

A camera system for conditional recording in a room that includes a camera configured to record video, at least one presence detection module configured to detect the presence of individuals in the room, a processor communicatively connected to the camera and the presence detection module, the processor being configured to automatically initiate video recording when the presence detection module identifies the presence of at least two individuals in the room and automatically stop video recording when the presence detection module detects the presence of only one individual or no individuals in the room, and a storage device configured to securely store recorded video files.

5 Claims, 1 Drawing Sheet

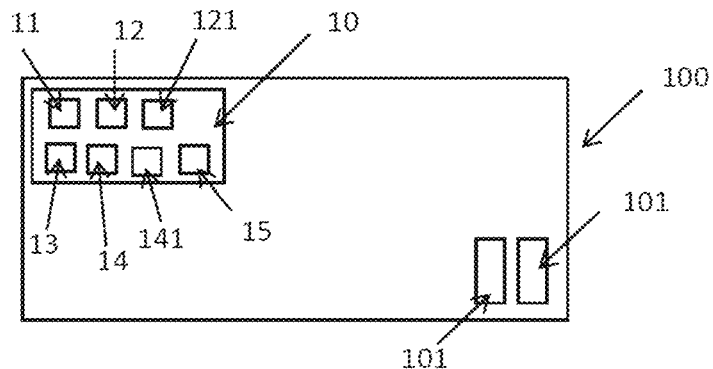
FIG. 1
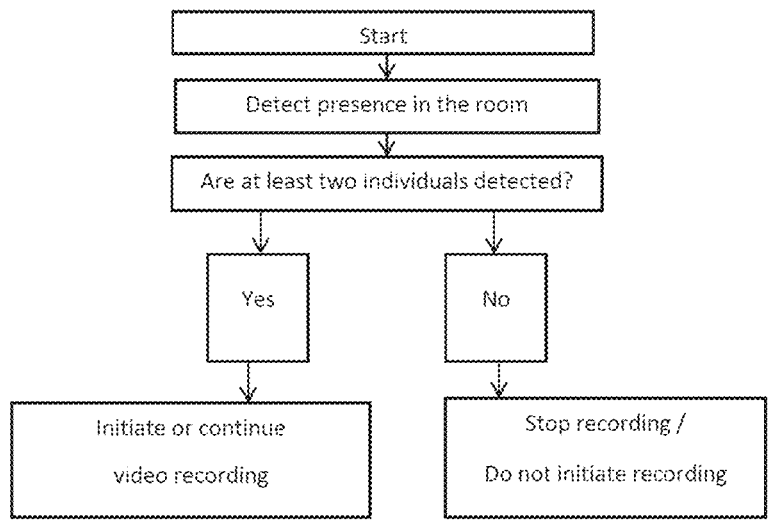
FIG. 2
| Timestamp | | Individual Detected | Recording Status |
|---|---|---|---|
| 2025-01-08 | 08:00:00 | 0 | Not Recording |
| 2025-01-08 | 08:01:00 | 1 | Not Recording |
| 2025-01-08 | 08:02:00 | 2 | Recording |
| 2025-01-08 | 08:03:00 | 2 | Recording |
| 2025-01-08 | 08:04:00 | 1 | Not Recording |
FIG. 3

CAMERA SYSTEM FOR CONDITIONAL RECORDING

TECHNICAL FIELD

The present invention relates to video recording systems, and more specifically to a camera system configured to automatically record video only under predefined conditions in a place such as a room or a car, for example, such as when the presence of at least two individuals is detected.

BACKGROUND

Cameras are commonly used for security, monitoring, and evidence recording in private and professional spaces, such as office rooms, clinic rooms, cars and the like. The term "room" hereinafter and in the claims means rooms, offices, clinic, cars and the like. However, constant recording raises privacy concerns, particularly in environments such as offices or personal rooms and places. There is a need for a system that balances privacy with the ability to record interactions when specific conditions, such as the presence of two or more individuals, are met. Additionally, it is desirable to have a transparent mechanism to verify non-recording periods, ensuring that privacy is upheld without external interference.

SUMMARY OF THE INVENTION

The present invention provides a camera system that automatically records video when certain conditions are met. Specifically, the system:

(1) Initiates video recording when at least two individuals are detected in the place.

(2) Stops recording when fewer than two individuals are present.

(3) Optionally, records only when the detected individuals include at least one man and one woman.

(4) Logs detection events to demonstrate periods when recording was not conducted due to a lack of qualifying triggers.

(5) storage of the recorded video files.

This system combines advanced presence detection, and privacy-preserving mechanisms to address the challenges of traditional camera systems.

DESCRIPTION OF THE DRAWINGS

The intention of the drawings attached to the application is not to limit the scope of the invention and its application. The drawings are intended only to illustrate the invention and they constitute only one of its many possible implementations.

FIG. 1 is an exemplary block diagram of the camera system, showing the camera, presence detection module, processor, and storage device.

FIG. 2 is a flowchart illustrating the operation of the processor for initiating and stopping video recording based on presence detection results.

FIG. 3 is a sample log file showing timestamps and detection events to verify periods of non-recording.

DETAILED DESCRIPTION OF THE INVENTION

1. System Components

The camera system (10) comprises the following key components:

Camera (11): Capable of automatically recording high-quality video. Presence Detection Module (12): Detects the presence and count of individuals in the place. This module can include sensors (121) such as camera, infrared, motion detectors, or AI-based video analysis for identifying individuals and determining characteristics such as gender.

Processor (13): A microcontroller or equivalent device that processes input from the presence detection module to control video recording.

The camera system may include a Storage Device (14) or a connector (141) with the ability to connect it to an external storage device, which may be a digital storage medium, for saving recorded video files and detection logs.

The Presence Detection Module may be of the kind, such as, Passive infrared (PIR) sensors that are used for occupancy detection and are sensitive to changes in infrared radiation (human motion, for example); Image recognition of human shapes based on a camera and processor that analyzes videos of repeated photos of the room.

2. Automatic Recording Conditions

The processor (13) initiates video recording only when the following conditions are met: At least two individuals (101) are detected in the room, and in another embodiment, (Optional) when detected individuals include at least one man and one woman. Recording stops automatically when fewer than two individuals are present.

3. Event Logging

The presence detection module (12) continuously monitors the place (100), even when no recording is active. A log file is maintained to record the following:

Timestamps of each detection event.

The number of individuals detected.

An indication of periods when fewer than two individuals were present.

This log serves as evidence to demonstrate that non-recording periods were due to a lack of qualifying conditions, ensuring transparency and privacy.

4. Privacy and Security Features

The camera system (10) may include a Notification Module (15) to alerts individuals in the place when recording is active via a visual (Led), audible, or textual signal.

5. Additional Functionalities

Periodic Verification: The processor (13) periodically checks the functionality of the presence detection module (12) and camera (11) to ensure consistent operation.

Time-Stamping: All recorded video files and detection logs are timestamped to provide accurate records of events.

EXAMPLES OF OPERATION

Example 1: Place (Room) with Two Individuals

The system detects the presence of two individuals in the place. The processor initiates video recording and activates a visual indicator. When one individual leaves the room, the processor stops recording, and the visual indicator is turned-off, and maybe another indicators is turned-on to informs that the camera is not recording. For example, a red Led means no-recording and a green Led means active recording.

Example 2: Mixed-Gender Detection

The presence detection module identifies one man and one woman in the room. The processor starts video recording. If the room contains two men or two women, the processor does not initiate recording, respecting the predefined condition. This feature is important if the camera system aimed mainly to prevents or serves as an evidence for a sexual misconduct (mainly between sexes) and by that preserve privacy when two men or two women in the room.

Example 3: Privacy Log Verification

The system detects no individuals in the room, for example for several hours. The log file records these detection events and timestamps, serving as proof that no recording occurred during this period due to the fact that no one was in the room, or was only one person.

Advantages of the Invention

Privacy Assurance: Ensures that recording occurs only under specific, predefined conditions. When a person is alone in the place (for example, in his office room or his car), he can be sure that the camera system does not record his activity and he may feel free to behave normally without a fear that he is recorded by a video. When someone enters his place the system automatically starts to records and stops when that person leaves the room. Also, storing the detection results as to the fact that in the room was not more than one person may serves as a prove that nothing happened between two persons.

Transparency: Maintains a verifiable log to demonstrate periods of non-recording.

Automation: Operates without requiring manual intervention, providing seamless functionality.

FIG. 1 is block diagram of the camera system, showing the camera, presence detection module, processor, and storage device. FIG. 2 is a flowchart illustrating the operation of the processor for initiating and stopping video recording based on presence detection results. This figure is a Flowchart of Operational Workflow that outlines the logical steps the system follows, starting with detecting individuals in the room, checking their count (and gender), and proceeding to initiate or stop or continuing recording based on these conditions. FIG. 3 is a sample log file showing timestamps and detection events to verify periods of non-recording. This figure is Example Log File Format that comprises a table provides a sample of the log file that records timestamps, the number of individuals detected, their genders, and the recording status. It serves as proof of when recording occurred and when it did not.

What we claim is:

1. A camera system for conditional recording of a captured area in a room, comprising:
   (a) a camera configured to record video;
   (b) an individual recognition module configured to recognize presence of individuals in the room;
   (c) a processor communicatively connected to the camera and the individual recognition module, the processor being configured to:
       (i) initiate video recording when the individual recognition module recognizes presence of at least two individuals in the room;
       (ii) stop the video recording when the individual recognition module recognizes presence of only one individual or no individuals in the room; and
   (d) a storage device configured to store the recorded video files or a connection configured to connect the camera system to an external storage device for storing the recorded video files.

2. The camera system of claim 1, wherein the processor is further configured to store a log of individual detection results from said individual recognition module in the processor, in said storage device, or said external storage device, wherein the log includes timestamps of detection events, and an indication of whether the individual recognition module recognizes presence of fewer than two individuals in the room.

3. The camera system of claim 1, wherein said individual recognition module comprises at least one of:
   an infrared sensor,
   a motion detector, or
   an artificial intelligence-based video analysis module configured to recognize and count presence of individuals in the room.

4. A camera system, comprising:
   (a) a camera configured to generate a continuous live view of a captured area;
   (b) a storage device configured to store video files, or a connection configured to link the camera system to an external storage device for storing video files;
   (c) a processor communicatively connected to the camera, the processor being configured to:
       (i) continuously recognize presence of individuals in the continuous live view;
       (ii) initiate saving of the continuous live view in the storage device or external storage device upon recognizing presence of at least two individuals in said continuous live view; and
       (iii) stop said saving upon recognizing presence of only one individual or no individuals in the continuous live view.

5. The camera system of claim 4, wherein the processor is further configured to store a log of individual detection results in said continuous live view in the processor, in said storage device, or said external storage device, wherein the log includes timestamps of detection events and an indication of whether the processor identified fewer than two individuals in the live view.

* * * * *